United States Patent [19]
Xu et al.

[11] Patent Number: 5,510,596
[45] Date of Patent: Apr. 23, 1996

[54] PENETRATION SENSOR/CONTROLLER ARC WELDER

[75] Inventors: Xiaoshu Xu; Jerald E. Jones, both of Knoxville, Tenn.

[73] Assignee: American Welding Institute, Knoxville, Tenn.

[21] Appl. No.: 52,739

[22] Filed: Apr. 27, 1993

(Under 37 CFR 1.47)

[51] Int. Cl.$^6$ ............................................. B23K 9/095
[52] U.S. Cl. ........................ 219/130.01; 219/124.34; 219/130.21; 395/21
[58] Field of Search ..................... 219/130.01, 130.21, 219/137 PS, 124.34, 124.02, 124.03; 395/22, 21; 307/201

[56] References Cited

U.S. PATENT DOCUMENTS

| | | | |
|---|---|---|---|
| 3,264,447 | 8/1966 | Agnew | 219/124.02 |
| 3,694,621 | 9/1972 | Wofsey | 219/124.03 |
| 4,531,192 | 7/1985 | Cook | 364/513 |
| 4,595,820 | 6/1986 | Richardson | 219/137 PS |
| 4,616,121 | 10/1986 | Clocksin et al. | 219/124 |
| 4,721,947 | 1/1988 | Brown | 340/540 |
| 4,849,905 | 7/1989 | Loeb et al. | 364/513 |
| 4,877,940 | 10/1989 | Bangs et al. | 219/124 |
| 4,884,216 | 11/1989 | Kuperstein | 364/513 |
| 4,926,309 | 5/1990 | Wu et al. | 364/149 |
| 5,003,490 | 3/1991 | Castelaz et al. | 395/22 |
| 5,045,668 | 9/1991 | Neiheisel et al. | 219/121 |
| 5,283,418 | 2/1994 | Bellows et al. | 219/130.01 |
| 5,302,799 | 4/1994 | Kennedy et al. | 219/124.34 |
| 5,306,893 | 4/1994 | Morris et al. | 219/130.01 |

OTHER PUBLICATIONS

Karsai et al, "Gas Tungsten Arc Weld Modeling Using a Mapping Network", Neural Networks, vol. 1, supplement 1, p. 341, 1988.

*Primary Examiner*—Clifford C. Shaw
*Attorney, Agent, or Firm*—Finnegan, Henderson, Farabow, Garrett & Dunner

[57] ABSTRACT

An arc welding device apparatus for controlling an arc welder through use of a neural network in real-time. The invention can also record output from an arc welding apparatus, indicating whether penetration has occurred during the welding process, and can also activate an alarm when penetration occurs during the arc welding process.

27 Claims, 7 Drawing Sheets

5,510,596

PENETRATION SENSOR/CONTROLLER ARC WELDER

BACKGROUND OF THE INVENTION

This application relates to arc welding and, more specifically, to a method and apparatus for using a neural network to aid in controlling an arc welding process.

Conventional automatic arc welding devices are often used to perform a type of weld called a "blind side weld." In blind side welds, such as welds on jet exhaust assemblies, closure welds on the Space Shuttle main engine, tube and pipeline welds, etc., the back side of the weld cannot be monitored by a sensor or a human operator and partial penetration cannot be detected by sight.

In conventional arc welding systems a degree of penetration, i.e., a degree of depth of the weld with respect to the thickness of the material being welded affects the solidity of the weld. Solid welds are achieved only with full penetration. A welding operation that contains more than a given number of partial penetration welds may not be satisfactory and may need to be replaced. Thus, it is desirable to be able to detect and correct partial penetration during the welding process.

Any arc welding process produces a molten pool of welding material. In conventional arc welding devices, a vibration rate of a molten weld pool is different in a fully penetrated weld than in an incompletely penetrated weld. This vibration difference can be detected, and output as a voltage signal. However, due to a low signal to noise ratio and mixed signal information in the voltage data, conventional signal processing techniques are unable to distinguish useful and reliable penetration information from background noise and other types of extraneous signals. It is, therefore, desirable to be able to reliably distinguish penetration information from such a voltage signal.

SUMMARY OF THE INVENTION

The present invention overcomes the problems and disadvantages of the prior art by using a neural network to analyze voltage data indicating a degree of penetration during a weld. A controller receives the output of the neural network to control the welding process in accordance with the output of the neural network.

The present invention also allows the output of the neural network to be recorded for later use.

The present invention also allows a controller monitoring the output of the neural network to activate an alarm when a predetermined degree of penetration has occurred.

In accordance with the purpose of the invention, as embodied and broadly described herein, the invention is an apparatus for performing an arc weld, comprising: an arc welder for generating an arc; a voltage sensor for sensing a voltage of the arc and for outputting a voltage signal representing the sensed voltage; a neural network, coupled to the voltage sensor, for outputting a value responsive to the voltage signal and indicative of a degree of penetration occurring during the arc weld; and a controller, coupled to the neural network and the arc welder, for controlling the operation of the arc welder in accordance with the value output from the neural network.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. The same reference numbers will be used throughout the drawings to refer to the same or like parts.

The present invention uses a neural network to analyze a voltage signal from an arc welder. The output of the neural network indicates whether penetration has occurred. Various embodiment of the invention are described in the following paragraphs.

Figure 1:
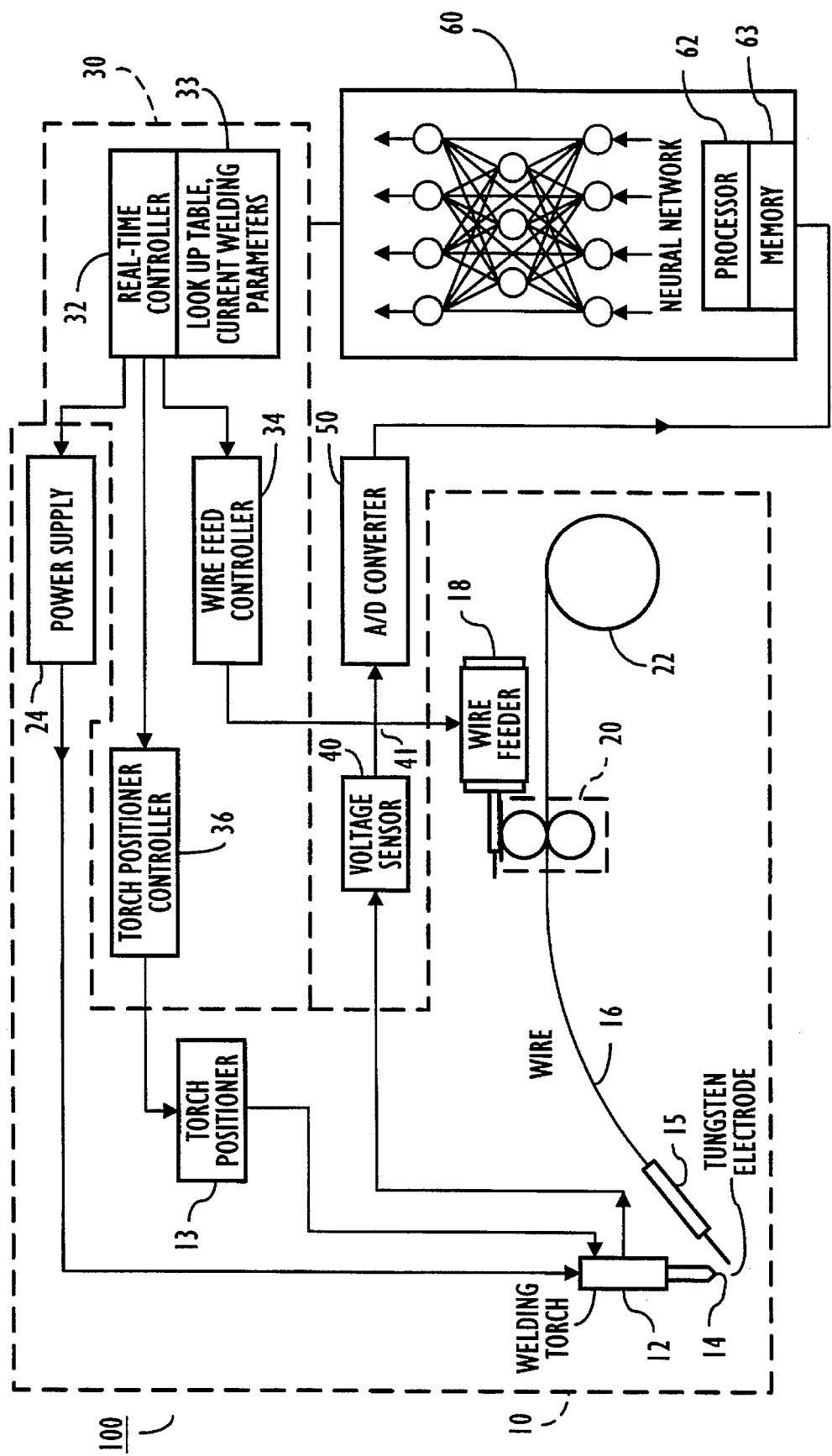
FIG. 1 is a block diagram of a first preferred embodiment of the invention for real-time control of an arc welding process.

FIG. 1 is a block diagram of a first preferred embodiment of the invention comprising an apparatus 100 for real-time control of an arc welding process. Apparatus 100 includes an arc welder 10, a controller 30, a voltage sensor 40, an analog to digital converter 50, and a neural network 60. Neural network 60 includes a processor 62 and a memory 63, as will be described below in more detail. Arc welder 10 further includes a welding torch 12, a torch positioner 13 for welding torch 12, a tungsten electrode 14 of welding torch 12, a weld wire 16, a wire feeder 18, wirefeeding elements 20, a wire spool 22, and a power supply 24 for welding torch 12. Controller 30 further includes real-time controller 32, memory 33, wire feed controller 34, and torch position controller 36.

In a well-known manner, weld wire 16 is applied to work pieces to be welded and is formed into a molten pool of weld material by heating action produced by an electric arc drawn between the weld wire 16 and the work piece. The operation of certain elements of arc welder 10 will not be described in detail herein, as they constitute welding elements of a type known to persons of ordinary skill in the art. In various embodiments, arc welder 10 may be used to perform Gas Metal Arc Welding (GMAW), Flux Cored Arc Welding (FCAW), Gas Tungsten Arc Welding (GTAW), and Submerged Arc Welding (SAW). Examples of these type of arc welding are discussed below. Materials to be welded include, e.g., carbon and stainless steel, aluminum, and low carbon steel.

Figure 2:
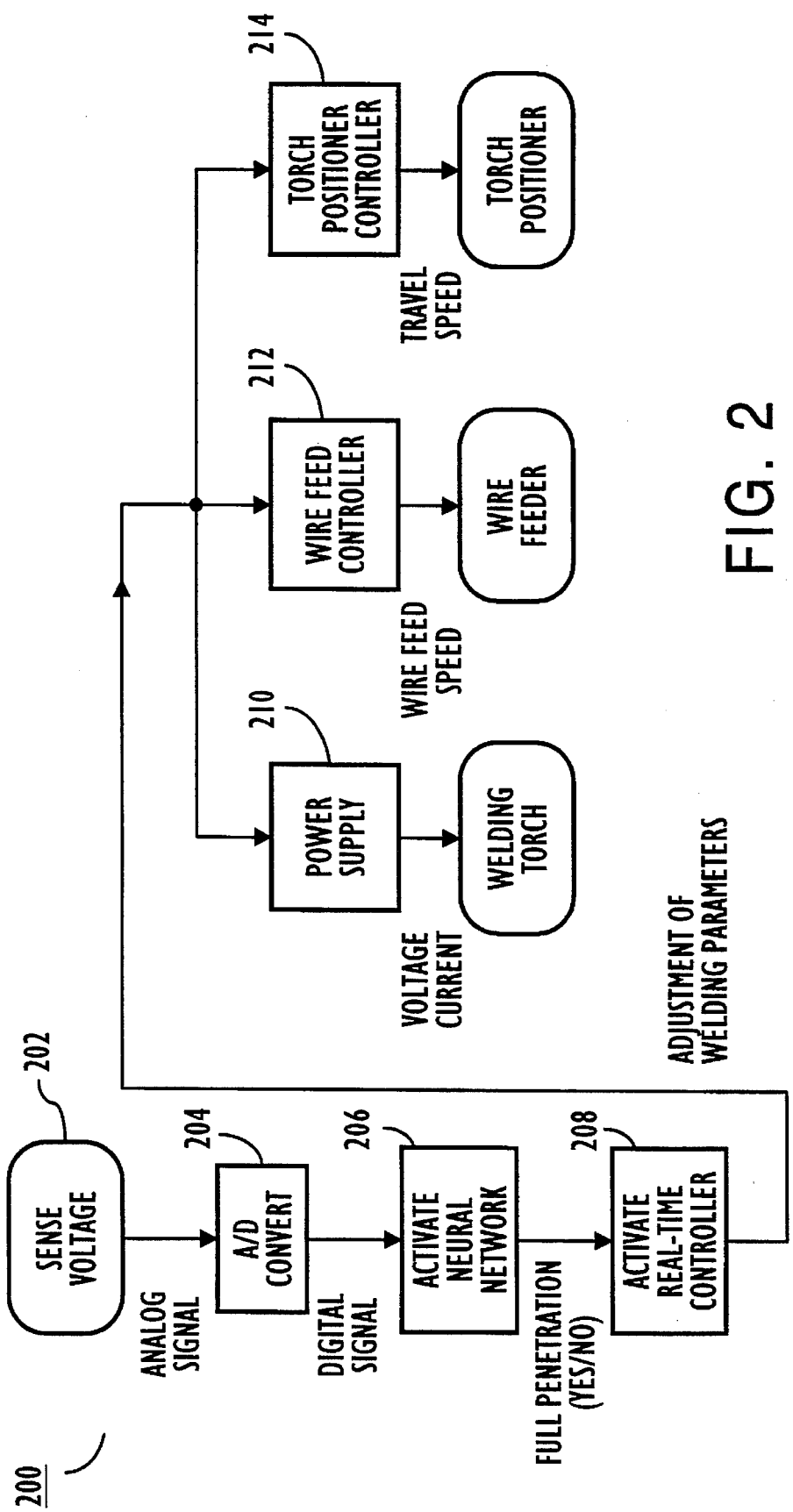
FIG. 2 is a flow chart showing steps performed by the first embodiment of FIG. 1.

Operation of the other elements shown in FIG. 1 will be described below in connection with the flow charts of FIGS. 2 and 3 and the diagrams of FIG. 4. Referring to FIG. 2, during a welding process performed by arc welder 10, voltage sensor 40, in step 202, senses an analog voltage representing a vibration rate of the molten weld pool. Voltage sensor 40 outputs an analog voltage signal on a signal line 41. The analog signal is which is converted to a digital voltage signal by analog to digital converter 50 in step 204. The digital voltage signal is then input to neural network 60 in step 206.

Preferably, neural network 60 is embodied as processor 62 simulating the operation of nodes in a neural network in memory 63, in a manner known to persons of ordinary skill in the data processing art. Processor 62 preferably is an Intel 486 processor, but can be any processor capable of operating at sufficient speed for a desired type of welding and sampling rate. Neural networks are described, for example, in the textbook "Parallel Distributed Processing" by David, Runelhart, James McClelland, and the PDP Research Group, published by MIT Press, 1986, which is herby expressly incorporated by reference.

In a first preferred embodiment, neural network 60 preferably has 100 nodes. Each node is defined by a weighted value and by connections to other nodes. Various weighted values may be used to simulate the nodes of a neural network, depending on the type of welding being performed by arc welder 10 and the type of material being welded. Thus, the exact network configuration and weight values can vary depending on the specific application (e.g., material to be welded, type of welding procedure used, thickness of material to be welded, type of electrode, type of power supply, joint design).

The input nodes of neural network 60 receive the digital voltage signal data in a certain time window. The nodes can be either evenly or non-linearly spaced in the time window. In the described embodiment, neural network 60 operates at a frequency of 200 Hz. Thus, a preferred sampling rate is 200 voltage samples per second. The voltage signal from analog to digital converter 50 preferably is an 8 bit signal, but can also be a 16 bit signal, a 32 bit signal, or a signal having some other desirable number of bits. Neural network 60 of FIG. 1 is deterministic, in that a given input will always produce the same output.

Appendix A defines two configurations of neural network 60 for two different applications. The configurations of neural network 60 are completely defined by the connections and weights of nodes used in neural network 60 A first example in Appendix A shows connections and weights of nodes in neural network 60 when arc welder 10 is used to weld carbon and stainless steel having a thickness range of 0.06 includes to 0.25 inches using a GTAW welding process. A second example of Appendix A shows connections and weights of nodes used in neural network 60 when arc welder 10 is used to weld carbon and stainless steel having a thickness range of 0.13 inches to 0.25 inches using a GMAW welding process.

Neural network 60 outputs a value indicating whether penetration has occurred during the weld. Preferably, the output value is in the range "0" to "1". A penetration threshold of the output value is defined as a value of "0.5". That is, an output greater than or equal to 0.5 corresponds to full penetration, and an output less than 0.5 corresponds to less than full penetration. Other embodiments of the invention may use different penetration threshold values. The output of neural network 60 is received by real-time controller 32 in step 208. Real-time controller 32 preferably is an Intel 486 processor, but can be any processor capable of operating at sufficient speed for a desired type of welding and sampling rate. In the described embodiment, neural network 60 and real-time controller 32 are implemented using the same processor. Other embodiments may use separate processors for neural network 60 and real-time controller 32.

In step 208 of FIG. 2, real-time controller 32 adjusts welding parameters and, in steps 210, 212, and 214, sends required control signals to respective ones of power supply 24, wire feed controller 34, and torch position controller 36 so that penetration is maintained during the weld. Details of the process of adjusting welding parameters are shown in FIG. 3.

Steps 210 through 214 of FIG. 2 show various values that real-time controller 32 causes the sub-controllers to send to components of arc welder 10. Step 210 of FIG. 2 shows the welding parameters (voltage and current) sent from power supply 24 to welding torch 12 under control of real-time controller 32. Step 212 of FIG. 2 shows the welding parameter (wire feed speed) sent from wire feed controller 34 to wire feeder 18 under control of real-time controller 32. Step 214 of FIG. 2 shows the welding parameter (travel speed) sent from torch position controller 36 to torch positioner 13 under control of real-time controller 32. Other embodiments of the invention may include other parameters, such as controlling the stand off, i.e., a distance that welding torch 12 is positioned from a welding plate, or torch angle, i.e., an angle of welding torch 12 with respect to the perpendicular.

Figure 3:
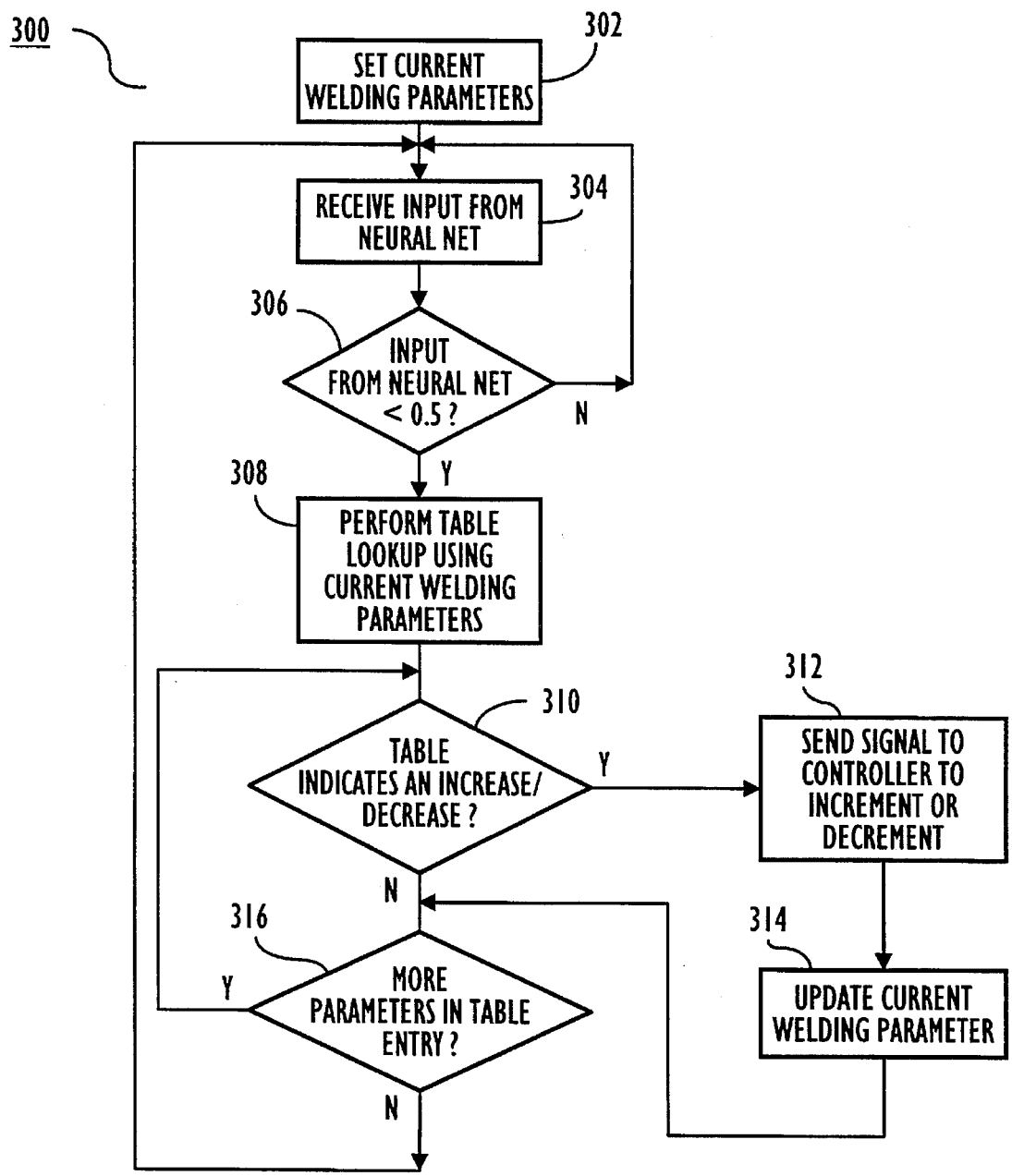
FIG. 3 is a flow chart showing steps performed by a real-time controller of the first embodiment of FIG. 1.

FIG. 3 is a flowchart 300 of steps performed by real-time controller 32 to control the operation of various sub-controllers in accordance with the value output from the neural network 60. In step 302, which is performed at some predetermined time such as power up, predetermined initial values for various welding parameters are set into memory 33 of real-time controller 32.

In step 304, real-time controller 32 receives the value output from neural network 60. As discussed above, this value is either greater than or equal to 0.5, indicating full penetration, or is less than 0.5, indicating less than full penetration. If, in step 306, real-time controller 32 determines that the value output from neural network 60 is greater than or equal to 0.5, control returns to step 304. If, in step 306, real-time controller 32 determines that the value output from neural network 60 is less than 0.5, control advances to step 308.

In step 308, real-time controller 32 performs a table lookup on a welding parameter lookup table stored in memory 33. The contents and format of welding parameter lookup table 33 varies depending on the type of weld being performed. Lookup tables for different types of welds may have different formats. For example, a lookup table where the material being welded is 0.1 inch thick steel and the weld process is GTAW is shown in Table 1. The welding position is flat, and the joint is a square butt with a 0.032 inch root opening.

TABLE 1

| Amps | Volts | Travel | WF | Amps | Volts | Travel | WF |
|------|-------|--------|----|------|-------|--------|----|
| 100  | 9.8   | 5.25   | 51 | 0    | +     | 0      | 0  |

TABLE 1-continued

| Amps | Volts | Travel | WF | Amps | Volts | Travel | WF |
|------|-------|--------|-----|------|-------|--------|-----|
| 123  | 8.9   | 5.7    | 39  | 0    | 0     | 0      | +   |
| 76   | 10.4  | 4.9    | 50  | +    | 0     | −      | −   |
| 91   | 8.8   | 5.6    | 58  | +    | 0     | 0      | −   |
| 113  | 9.1   | 5.3    | 42  | 0    | +     | 0      | +   |
| 117  | 8.5   | 4.9    | 74  | +    | 0     | 0      | +   |
| 153  | 7.4   | 4.4    | 94  | −    | +     | 0      | +   |

A lookup table where the material being welded is 0.25 inch thick low carbon steel and the weld process is GMAW is shown in Table 2. The welding position is flat and the joint is a square butt with a 1.0 mm root opening with backing bar.

TABLE 2

| Volts | Travel | WF  | Volts | Travel | WF |
|-------|--------|-----|-------|--------|-----|
| 28.5  | 11     | 230 | 0     | +      | 0   |
| 31    | 14     | 146 | 0     | 0      | +   |
| 24.4  | 14     | 211 | +     | 0      | 0   |
| 25.5  | 24     | 192 | 0     | −      | +   |
| 30.5  | 14     | 276 | −     | +      | +   |
| 28.5  | 13     | 230 | 0     | +      | 0   |
| 35    | 21     | 341 | −     | +      | +   |

The contents of lookup tables, such as those in Tables 1 and 2 are determined during actual welding experiments. Other lookup tables may be longer or shorter than those shown. The lookup table may be sorted or not, depending on a type of search used to perform the lookup operation. Table 2 has fewer table entries than Table 1 because of the type of welding process used (GMAW instead of GTAW).

Figure 4A:
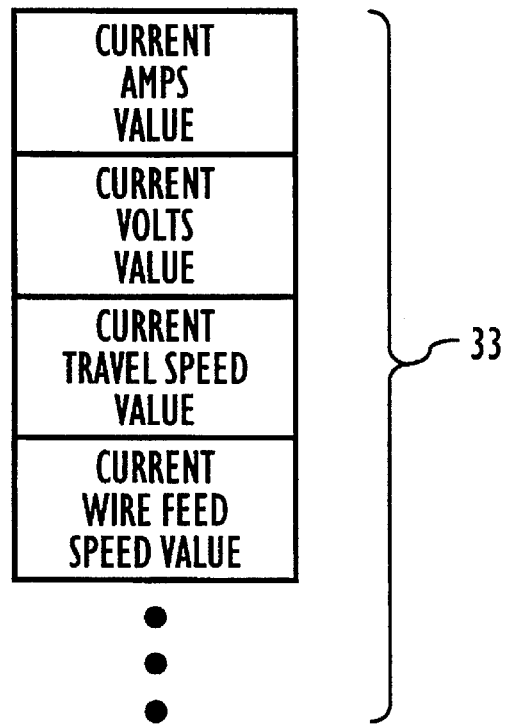
FIGS. 4(a) and 4(b) are diagrams of contents of a memory of the first embodiment of FIG. 1.
Figure 4B:
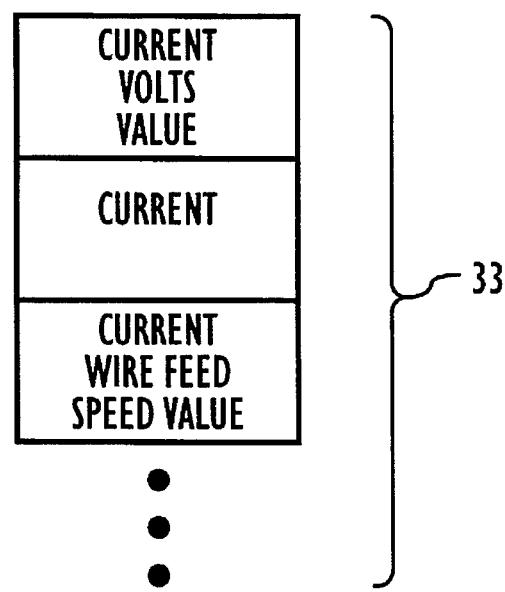

In step 308, real-time controller 32 uses the current welding parameter values shown in either of FIGS. 4(*a*) and 4(*b*) as values to search for in the lookup table. For example, for the lookup table shown in Table 1, real-time controller 32 searches for an entry matching the current values of welding parameters "Amps," "Volts," "Travel Speed," and "Wire Feed Speed." "Amps" refers to the current output from power supply 24 to welding torch 12. "Volts" refers to the voltage output from power supply 24 to welding torch 12. "Travel Speed" refers to the speed of welding torch 12 in feet per minutes, as controlled by torch position controller 36. "Wire Feed Speed" refers to the speed of wire feeder 18 in feet per minutes, as controlled by wire feed controller 34. For the lookup table shown in Table 2, real-time controller 32 searches for an entry matching the current values of welding parameters "Volts," "Travel Speed," and "Wire Feed Speed" because "amps" is not a variable parameter for this type of welding.

Once, an entry in the lookup table is found that matches the current welding parameter values, real-time controller 32 performs the loop comprising step 310 through 316 for each welding parameter that can be changed. Thus, for Table 1, the loop is performed four times. For Table 2, the loop is performed three times. If, for example, in step 308 real-time controller 32 determines that the first entry in Table 1 matches the current welding parameters, real-time controller 32 sends a signal to power supply 24 in step 312 that causes a voltage output from power supply 24 to be increased. The other welding parameters remain the same through successive passes through the loop.

As a further example, if real-time controller 32 determines that the third entry in Table 1 matches the current welding parameters, real-time controller 32, on a first pass through the loop, sends a signal to power supply 24 in step 312 that causes the current output from power supply 24 to be increased. On a third pass through the loop, real-time controller 32 sends a signal to torch position controller 36 that causes a travel speed of welding torch 12 to be decreased.

In a preferred embodiment of the invention, real-time controller 32 increases or decreases the welding parameters and the corresponding signals sent from the sub-controllers by very small amounts, on the order of 5% or less. Any small value may be chosen as the amounts of increase and decrease, and the amounts of increase and decrease do not have to be the same. Essentially, real-time controller 32 implements a feedback loop between the arc welder and real-time controller 32 in a manner known to persons of ordinary skill in the art. Alternate embodiments of the invention may adjust (increase or decrease) one welding parameter at a time in accordance with the values in the lookup table until penetration occurs.

In step 314, real-time controller 32 updates the values of current welding parameters stored in memory 33 (see FIG. 4). In step 316, if more welding parameters remain in the lookup table, control returns to the top of the loop at step 310. Otherwise control returns to step 304.

In an alternate embodiment, the output of neural network 60 could be used to indicate a degree of penetration, not simply whether full penetration has occurred. In such an embodiment, real-time controller 32 controls a feedback loop to maintain a desired degree of penetration in the weld. Again, in such an embodiment, the values in the lookup table in memory 33 would be determined by measurements during actual welds.

In an alternate embodiment, the output of neural network 60 may represent a degree of penetration and may be associated with a further output of neural network 60 representing a certainty factor.

In an alternate embodiment, the lookup table of real-time controller 32 may be embodied as a neural network where the inputs are the welding variables and the output is a degree of penetration, or an indication of whether penetration has occurred. Thus, the output of this second neural network would indicate which parameters to adjust and whether they need to be increased or decreased. Implementation of such a neural network using, for example, the values in Tables 1 and 2 is known to persons of ordinary skill in the art.

In an alternate embodiment, real-time controller 32 could be implemented as a rule-based system, having rules reflecting relationships such as those shown in FIGS. 1 and 2.

Figure 5:
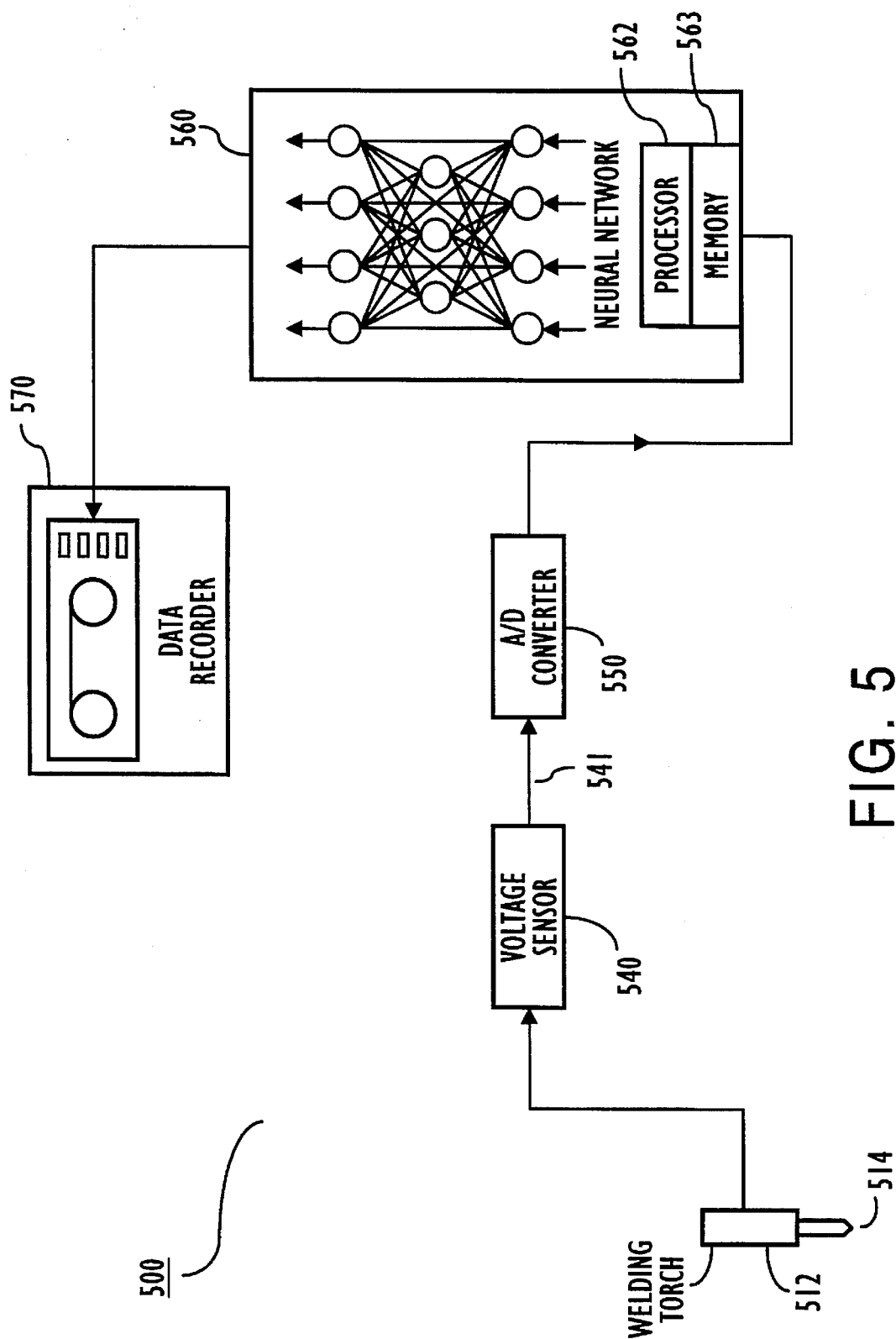
FIG. 5 is a block diagram of a second preferred embodiment of the invention for online recording of arc welding data.

FIG. 5 is a block diagram of a second preferred embodiment of the invention for online recording of arc welding data. FIG. 5 includes a welding torch 512, a voltage sensor 540, an analog to digital converter 550, a neural network 560, including a processor 562 and a memory 563, and a data recorder 570. The device of FIG. 5 also includes the elements of arc welder 10 of FIG. 1. However, these elements have not been shown for the sake of simplicity.

Those elements of FIG. 5 that are similar to elements described above in connection with FIG. 1 will not be described again. In the arc welding device, a data recorder 570 is coupled to neural network 560 for recording the output values from neural network 560. Data recorder 570 also records successive outputs from the neural network. Such recorded data may be used in training exercises for beginning welders to monitor the progress of beginning welders.

In an alternate embodiment, data recorder 570 is also coupled to arc welder 10. In this alternate embodiment, welding parameters, such as those shown in Tables 1 and 2, are recorded along with an associated output of neural network 560. Yet another embodiment also includes a clock coupled to data recorder 570, and data recorder 570 also records a time along with an associated output of neural network 560.

Figure 6:
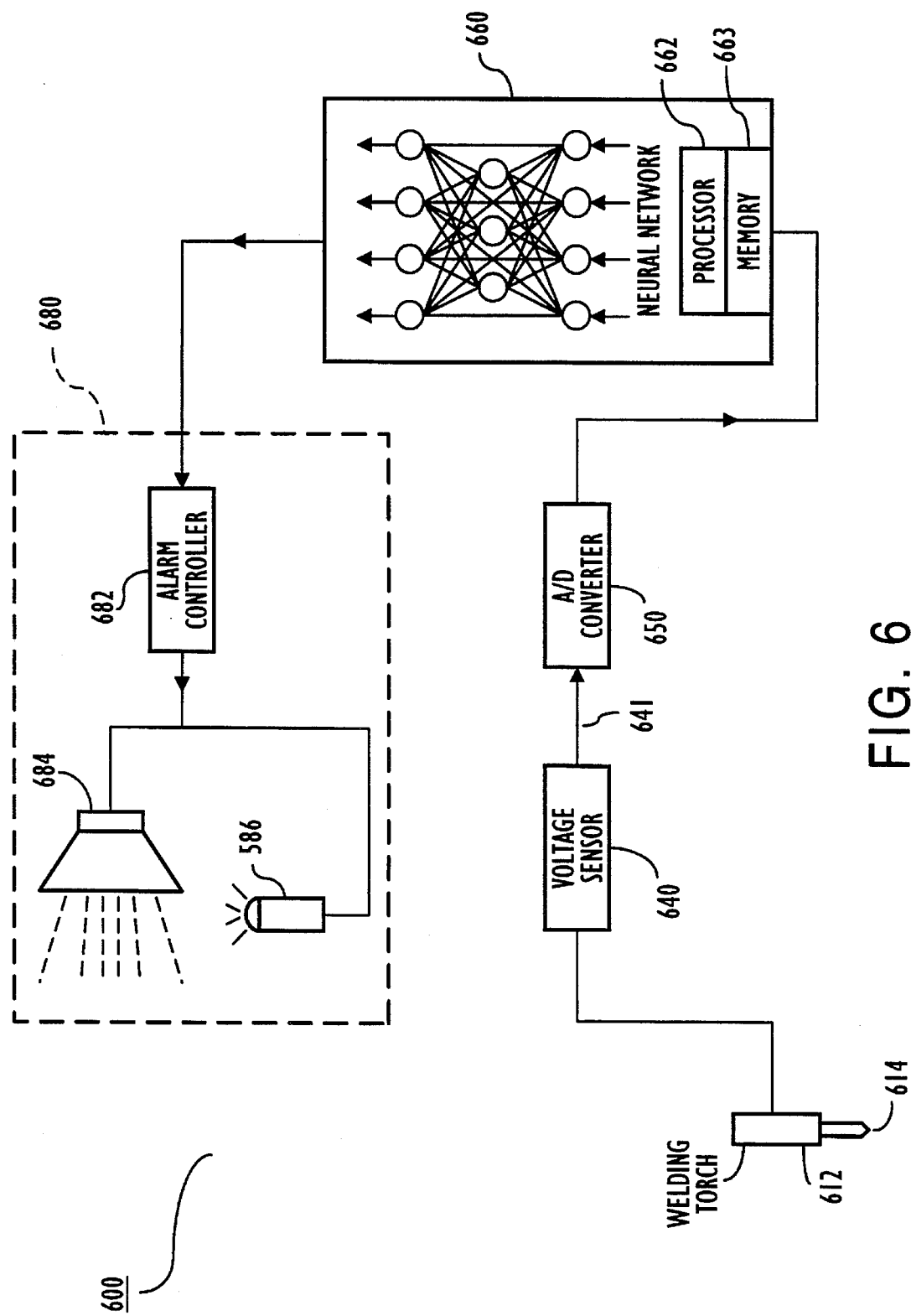
FIG. 6 is a block diagram of a third preferred embodiment of the invention for activating an alarm if penetration does not occur during arc welding.

FIG. 6 is a block diagram of a third preferred embodiment of the invention for activating an alarm if penetration does not occur during arc welding. FIG. 6 includes a welding torch 612, a voltage sensor 640, an analog to digital converter 650, a neural network 660, which includes a processor 662 and a memory 663, and an alarm unit 680. Alarm unit 680 includes an alarm controller 682, an audible alarm 684, such as a bell or buzzer, and a visual alarm 686, such as a light. The device of FIG. 6 may also include the elements of arc welder 10 of FIG. 1. However, these elements have not been shown for the sake of simplicity.

Those elements of FIG. 6 that are similar to elements described above in connection with FIG. 1 will not be described again. An alarm unit 680 is coupled to the neural network 660 for activating an alarm in accordance with the value output from the neural network. Alarm controller 682 of alarm unit 680 preferably is a programmable processor, but may also be an analog circuit capable of turning an alarm on or off in response to an input signal.

Figure 7:
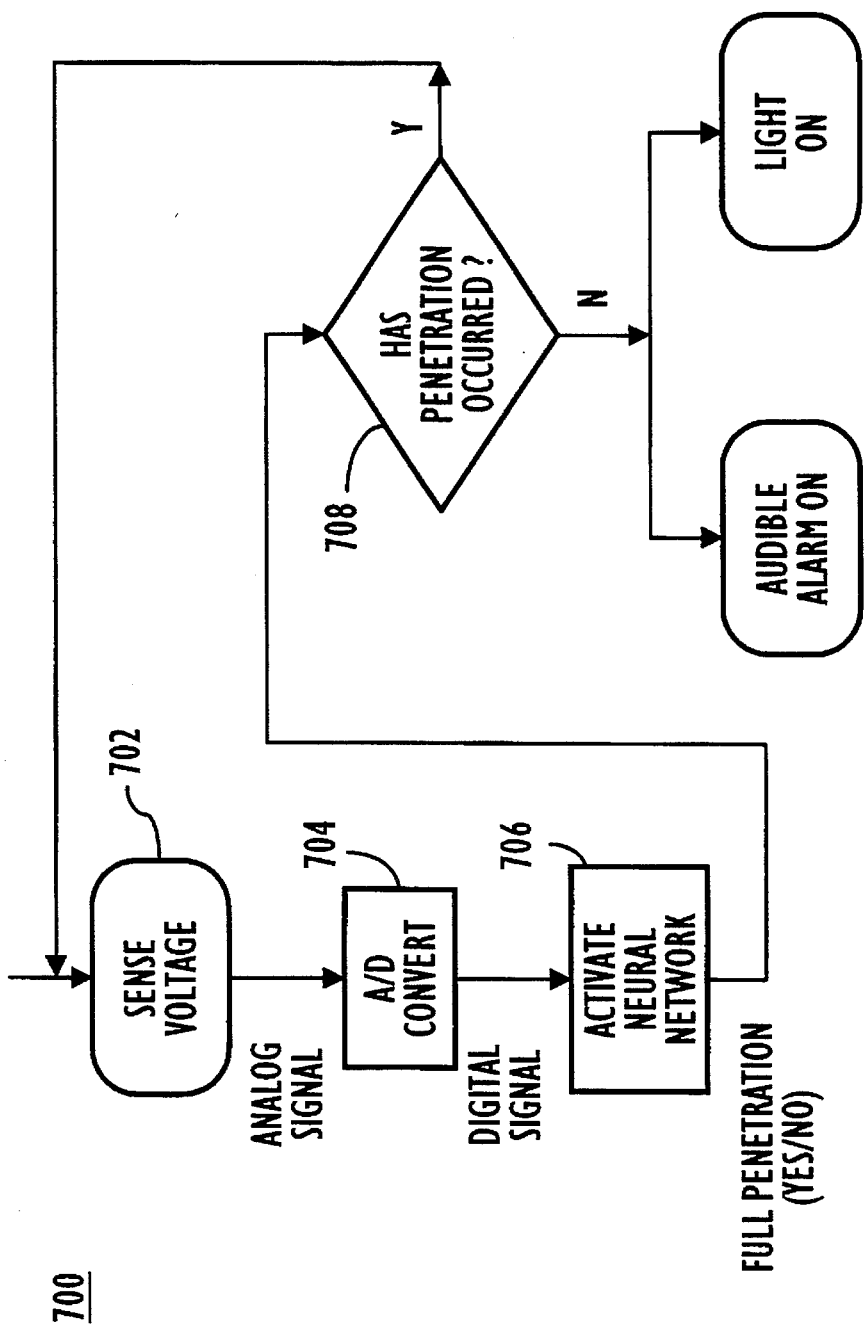
FIG. 7 is a flow chart showing steps performed by the third embodiment of FIG. 6.

FIG. 7 is a flow chart showing steps performed by the third embodiment of FIG. 6. During a welding process performed by welding torch 612, voltage sensor 640 senses an analog voltage representing a vibration rate of the molten weld pool in step 702. Voltage sensor 640 outputs an analog voltage signal on line 641, which is converted to a digital voltage signal by analog to digital converter 650 in step 704. The digital voltage signal is then input to neural network 660 in step 706. The output of neural network 760 is received by alarm controller 682 of alarm unit 680 In step 708, alarm controller 682 determines whether the output of neural network 760 indicates that penetration has occurred. Preferably, a penetration threshold of neural network 660 is defined as a value of "0.5". Thus, an output greater from neural network 660 greater than or equal to 0.5 corresponds to penetration, and an output less than 0.5 corresponds to less than full penetration. If penetration does not occur during the weld, then alarm controller 682 activates one or both of audible alarm 684 and visual alarm 686, depending on the embodiment of the invention, to indicate that penetration has not occurred. The apparatus may then be stopped by a human operator if desired.

In summary, the present invention uses a neural network to determine whether full penetration has occurred or to determine a degree of penetration during a welding process. Such a device allows a reliable determination of penetration.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. An apparatus for performing an arc weld, comprising:

an arc welder for generating an arc;

a voltage sensor for sensing a voltage of the arc and for outputting a voltage signal representing the sensed voltage;

a neural network, coupled to the voltage sensor, for analyzing a pattern represented by said voltage signal and outputting a value indicative of whether full penetration has occurred during the arc weld; and a controller, coupled to the neural network and the arc welder, for controlling the operation of the arc welder in accordance with the value output from the neural network to ensure full penetration.

2. The apparatus for performing an arc weld of claim 1, wherein the arc welder includes a welding torch, a tungsten electrode, a wire feeder, and a torch positioner.

3. The apparatus for performing an arc weld of claim 1, wherein the voltage sensor includes an analog to digital converter.

4. The apparatus for performing an arc weld of claim 1, wherein the neural network comprises a neural network optimized for Gas Metal Arc Welding.

5. The apparatus for performing an arc weld of claim 1, wherein the neural network comprises a neural network optimized for Gas Tungsten Arc Welding.

6. The apparatus for performing an arc weld of claim 1, wherein the neural network comprises a neural network optimized for Flux Cored Arc Welding.

7. The apparatus for performing an arc weld of claim 1, wherein the neural network comprises a neural network optimized for Submerged Arc Welding.

8. The apparatus for performing an arc weld of claim 1, wherein the controller includes a processor.

9. The apparatus for performing an arc weld of claim 1, wherein the neural network includes a processor simulating the operation of nodes in a neural network.

10. The apparatus for performing an arc weld of claim 1, wherein the arc welder includes a wire feeder and wherein the controller includes a wire feed controller for controlling the wire feeder in accordance with the output from the neural network.

11. The apparatus for performing an arc weld of claim 1, wherein the arc welder includes a welding torch and a welding torch power supply and wherein the controller includes means for controlling the welding torch power supply in accordance with the output from the neural network.

12. The apparatus for performing an arc weld of claim 1, wherein the arc welder includes a welding torch and wherein the controller includes a welding torch positioning controller for controlling a position of the welding torch in accordance with the output from the neural network.

13. The apparatus for performing an arc weld of claim 12, wherein the welding torch positioning controller includes means for controlling a travel speed of the welding torch.

14. The apparatus for performing an arc weld of claim 1, wherein the neural network outputs a value indicating whether or not penetration has occurred.

15. An apparatus for performing an arc weld, comprising:

an arc welder for generating an arc;

a voltage sensor for sensing a voltage of the arc and for outputting a voltage signal representing the sensed voltage;

a neural network, coupled to the voltage sensor, for analyzing a pattern represented by said voltage signal and outputting a value indicative of whether full penetration has occurred during the arc weld; and a data recorder, coupled to the neural network, for recording the value output from the neural network.

16. The arc welding device of claim 15, wherein the data recorder records successive outputs from the neural network.

17. The arc welding device of claim 15, wherein the neural network includes a processor simulating the operation of nodes in a neural network.

18. The apparatus for performing an arc weld of claim 15, wherein the neural network outputs a value indicating whether or not penetration has occurred.

19. An apparatus for performing an arc weld, comprising:

an arc welder for generating an arc;

a voltage sensor for sensing a voltage of the arc and for outputting a voltage signal representing the sensed voltage;

a neural network, coupled to the voltage sensor, for analyzing a pattern represented by said voltage signal and outputting a value indicative of whether full penetration has occurred during the arc weld; and an alarm unit, coupled to the neural network, for activating an alarm in accordance with the value output from the neural network.

20. The arc welding device of claim 19, wherein the alarm unit includes means for activating an alarm when the value output from the neural network indicates that full penetration has not occurred during the arc weld.

21. The arc welding device of claim 19, wherein the alarm unit includes means for activating an audible alarm.

22. The arc welding device of claim 19, wherein the alarm unit includes means for activating a visual alarm.

23. The arc welding device of claim 19, wherein the controller includes a processor.

24. The arc welding device of claim 19, wherein the neural network includes a processor simulating the operation of nodes in a neural network.

25. A method for performing an arc weld, comprising:

activating an arc welder for generating an arc;

sensing a voltage of the arc and outputting a voltage signal representing the sensed voltage;

analyzing, with a neural network, a pattern represented by said voltage signal;

outputting, by said neural network, a value indicating whether full penetration has occurred during the arc weld in response to said analyzed pattern represented by said voltage signal; and controlling the operation of the arc welder in accordance with the value output from the neural network.

26. A controller for controlling an arc welding apparatus producing an arc, comprising:

a voltage sensor for sensing a voltage of the arc and for outputting a voltage signal representing the sensed voltage;

a neural network, coupled to the voltage sensor, for analyzing a pattern represented by said voltage signal and outputting a value indicative of whether full penetration has occurred during the arc weld.

27. The controller of claim 26, further including a real-time controller, coupled to the neural network, for outputting a control signal capable of controlling the operation of the arc welder in accordance with the value output from the neural network.

* * * * *